US012062903B2

(12) United States Patent
Young et al.

(10) Patent No.: US 12,062,903 B2
(45) Date of Patent: Aug. 13, 2024

(54) DATA ALIGNMENT METHOD, DIFFERENTIAL PROTECTOR AND DIFFERENTIAL PROTECTION SYSTEM

(71) Applicant: Schneider Electric Industries SAS, Rueil-Malmaison (FR)

(72) Inventors: Ian Young, Ingleburn (AU); Yansong Gao, Shanghai (CN); Xuedi Liang, Shanghai (CN); Yong Wei, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 68 days.

(21) Appl. No.: 18/099,999

(22) Filed: Jan. 23, 2023

(65) Prior Publication Data
US 2023/0246438 A1    Aug. 3, 2023

(30) Foreign Application Priority Data

Jan. 30, 2022   (CN) .......................... 202210113635.7

(51) Int. Cl.
*H02H 3/28*    (2006.01)
(52) U.S. Cl.
CPC ..................... *H02H 3/28* (2013.01)
(58) Field of Classification Search
CPC ........... H02H 3/28; H02H 7/261; H02H 7/263
See application file for complete search history.

(56) References Cited

U.S. PATENT DOCUMENTS

| 2010/0191386 | A1* | 7/2010 | Sezi | H02H 3/28 706/12 |
| 2011/0063766 | A1* | 3/2011 | Kasztenny | H02H 3/30 361/63 |
| 2016/0352500 | A1* | 12/2016 | Benjamini | H04L 25/14 |
| 2022/0239089 | A1* | 7/2022 | Nelms | H02H 7/263 |

FOREIGN PATENT DOCUMENTS

CN          112421566 A    *  2/2021    ........... H02H 1/0061

* cited by examiner

*Primary Examiner* — Harry R Behm
(74) *Attorney, Agent, or Firm* — Locke Lord LLP

(57) ABSTRACT

Provided are a data alignment method, a differential protector, and a differential protection system. The data alignment method comprises: obtaining first sampled current data from a first sampling device; receiving a second message from a second differential protector, the second message comprising second sampled current data and its sampling time stamp, first time information of the second differential protector related to a difference in time of reception from receipt of the first message to a second time node, and second time information of the second differential protector related to a second transmission processing delay from the second time node to transmission of the second message; when time synchronization is maintained, calculating and storing a time calculation deviation between a third time node and a first calculated value of the second time node; when time synchronization is lost, determining the third time node according to the stored time calculation deviation.

10 Claims, 4 Drawing Sheets

DATA ALIGNMENT METHOD, DIFFERENTIAL PROTECTOR AND DIFFERENTIAL PROTECTION SYSTEM

TECHNICAL FIELD

Embodiments of the present disclosure relates to a data alignment method for a differential protector, a differential protector, and a differential protection system.

BACKGROUND

In power transmission systems, differential protection is often used to realize protection of devices as well as power lines. According to the principle of the differential protection, a differential protector needs to obtain current sample data from each end (two or more ends) of a differential protection area, and these current sample values must be aligned in time. Traditionally, the differential protector receives current information directly from a current transformer, and thus the differential protector obtains the current information in a negligible amount of time. However, with the development of substation automation systems, current values collected by the current transformer are first transmitted to the merging unit, which then transmits them to the differential protector via a network communication method such as a process bus.

The delay caused by the merging unit is uncertain and the differential protector takes additional time to try to obtain the delay of the merging unit connected to other differential protectors, resulting in longer response times for subsequent operations. If both the merging unit and the differential protector are time-synchronized with each other, the delay caused by the merging unit can be eliminated by calculation. However, if the time synchronization of the differential protector is broken, the delay caused by the merging unit combined with the uncertainty of the time information makes it difficult to realize correct differential protection in this case.

SUMMARY OF THE DISCLOSURE

At least one embodiment of the present disclosure provides a data alignment method, a differential protector, and a differential protection system, which can solve the technical problem that it is difficult to realize differential protection correctly when differential protectors lose time synchronization.

At least one embodiment of the present disclosure provides a data alignment method for a first differential protector, comprising: obtaining, at a first time node tA, first sampled current data from a first sampling device; transmitting a first message to a second differential protector after a first transmission processing delay ta, the first message comprising the first sampled current data; receiving, at a first moment tA*, a second message from the second differential protector, the second message comprising second sampled current data and its sampling time stamp, first time information of the second differential protector related to a difference in time of reception tc from receipt of the first message to a second time node, and second time information of the second differential protector related to a second transmission processing delay td from the second time node to transmission of the second message, the second time node being a time point when a second sampling device obtains the second sampled current data; when the first differential protector is in time synchronization with the second differential protector, determining a third time node at which the first differential protector obtains third sampled current data corresponding to the sampling time stamp of the second sampled current data from the first sampling device according to the sampling time stamp, and calculating a first calculated value of the second time node at which the second differential protector obtains the second sampled current data from the second sampling device according to the first time node tA, the first moment tA*, the first transmission processing delay ta, the difference in time of reception tc, and the second transmission processing delay td, and calculating and storing a time calculation deviation tmem between the third time node and the first calculated value of the second time node; when the first differential protector loses time synchronization with the second differential protector, calculating a second calculated value of the second time node according to the first time node tA, the first moment tA*, the first transmission processing delay ta, the difference in time of reception tc, and the second transmission processing delay td, and determining the third time node according to the second calculated value of the second time node and the stored time calculation deviation tmem.

For example, in a method provided in an embodiment of the present disclosure, calculating the first calculated value of the second time node at which the second differential protector obtains the second sampled current data from the second sampling device comprises: calculating a calculated value tp of a transmission delay of data transmission between the first differential protector and the second differential protector using the first time node tA, the first moment tA*, the first transmission processing delay ta, the difference in time of reception tc, and the second transmission processing delay td; and calculating the first calculated value using the first moment tA*, the second transmission processing delay td and the calculated value tp of the transmission delay; wherein, the calculated value tp of the transmission delay is calculated using the following formula: $tp=\frac{1}{2}(tA^*-tA-ta-tc-td)$; the first calculated value tB' of the second time node is calculated using the following formula: $tB'=tA^*-td-tp$.

For example, in a method provided in an embodiment of the present disclosure, calculating the second calculated value of the second time node according to the first time node tA, the first moment tA*, the first transmission processing delay ta, the difference in time of reception tc, and the second transmission processing delay td comprises: calculating a calculated value tp of a transmission delay of data transmission between the first differential protector and the second differential protector using the following formula: $tp=\frac{1}{2}(tA^*-tA-ta-tc-td)$; calculating the second calculated value tB" using the following formula: $tB''=tA^*-td-tp$.

For example, in a method provided in an embodiment of the present disclosure, determining the third time node according to the second calculated value of the second time node and the stored time calculation deviation tmem comprises: calculating an estimated value of the third time node from the sum of the second calculated value and the time calculation deviation tmem and taking as the third time node a time node closest to the estimated value of the third time node among a plurality of time nodes at which the first differential protector obtains sampled current data from the first sampling device; wherein the estimated value tA' of the third time node is calculated using the following formula: $tA'=tA^*-td-tp+tmem$.

For example, in a method provided in an embodiment of the present disclosure, when the first differential protector is in time synchronization with the second differential protector, the method further comprises: calculating and storing the time calculation deviation tmem whenever a time synchronization signal is received or calculating and storing the time calculation deviation tmem whenever the sampled current data from the first sampling device is received.

For example, in a method provided in an embodiment of the present disclosure, the second message further indicates that the second differential protector loses time synchronization or regains time synchronization.

For example, in a method provided in an embodiment of the present disclosure, the first sampling device is a first merging unit, and the second sampling device is a second merging unit, the first merging unit and the second merging unit obtain sampled current values from different locations of the same power line respectively.

For example, in a method provided in an embodiment of the present disclosure, the first differential protector and the second differential protector use satellite timing to maintain time synchronization.

At least one embodiment of the present disclosure provides a differential protector comprising a processor and a memory having program codes stored thereon, the program codes, when executed by the processor, perform the data alignment method as described in any one of the above embodiments.

At least one embodiment of the present disclosure provides a differential protection system for a power line, comprising: a first sampling device and a second sampling device configured to obtain sampled current values from different locations at the power line, respectively; a first differential protector, connected to the first sampling device, and configured to receive first sampled current data transmitted by the first sampling device; and a second differential protector, connected to the second sampling device, and configured to receive second sampled current data transmitted by the second sampling device, wherein the first differential protector and the second differential protector are each the differential protector as described in the above embodiments.

BRIEF DESCRIPTION OF THE DRAWINGS

In order to more clearly illustrate the technical solutions of embodiments of the present disclosure, the accompanying drawings of the embodiments will be briefly described below, and it will be apparent that the accompanying drawings described below relate only to some embodiments of the present disclosure and are not a limitation of the present disclosure.

DESCRIPTION OF THE EMBODIMENTS

In order to make the objects, technical solutions and advantages of the embodiments of the present disclosure clearer, the technical solutions of the embodiments of the present disclosure will be clearly and completely described below in conjunction with the accompanying drawings. Obviously, the described embodiments are some of the embodiments of the present disclosure, and not all of them. Based on the described embodiments of the present disclosure, all other embodiments obtained by a person of ordinary skill in the art without creative effort fall within the scope of the present disclosure.

Unless otherwise defined, technical or scientific terms used in the present disclosure shall have the ordinary meaning as understood by persons having ordinary skill in the art to which the present disclosure pertains. The terms "first", "second" and the like as used in the present disclosure do not indicate any order, number, or importance, but are used only to distinguish the different components. Similarly, the words "one", "a", or "the" and similar words do not indicate a numerical limitation, but rather the presence of at least one. Words such as "includes" or "comprises" and the like are intended to mean that the components or objects appearing before the word cover the components or objects listed after the word and their equivalents, and do not exclude other components or objects. Words such as "connected" or "linked" are not limited to physical or mechanical connections, but may include electrical connections, whether direct or indirect. The terms "up", "down", "left", "right", etc. are used only to indicate relative position relationships, and when the absolute position of the object being described changes, the relative position relationship may also change accordingly.

Figure 1:
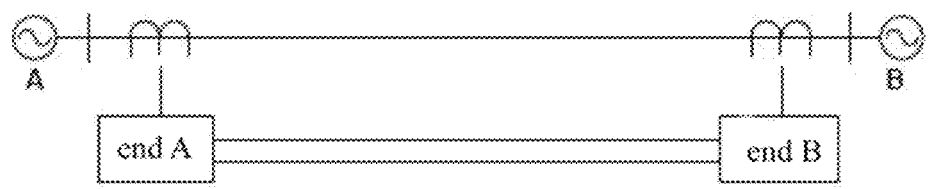
FIG. 1 illustrates a timing schematic diagram of a differential protection scheme and a data alignment scheme in a case of obtaining current data without delay.
Figure 1:
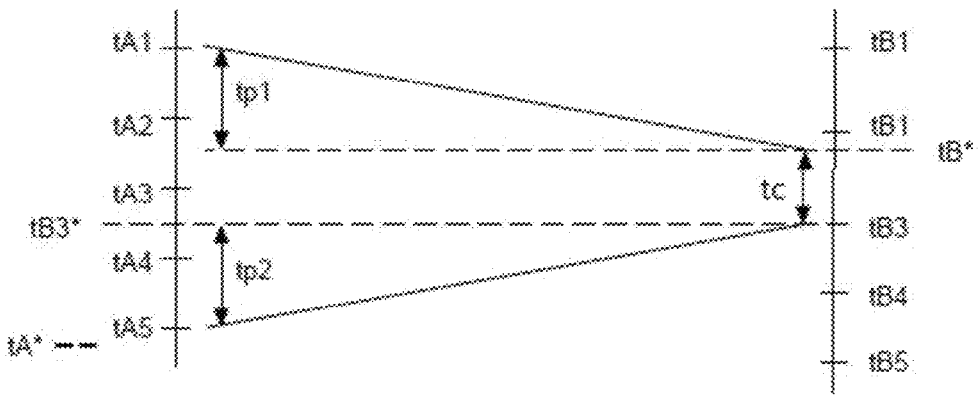

FIG. 1 illustrates a timing schematic diagram of a differential protection scheme and a data alignment scheme without transmission processing delay of current data. A and B are noted as the two ends of the power line. Differential protector A and differential protector B are used at end A and end B respectively. Both differential protector A and differential protector B can directly use current mutual inductance to sense the current in the power line, so that there is almost no delay between the time when the differential protector A and the differential protector B obtain current data and the time of real current. The differential protector A and the differential protector B transmit data to each other through a communication link. In the absence of time synchronization between the differential protector A and the differential protector B, data alignment can be realized by eliminating communication delays, i.e., asynchronous alignment.

In FIG. 1, a time node tAn and a time node tBn (n is an integer in the range of 1-5) are the moments when the current is sampled from the power line by the differential protector A and the differential protector B, and in the scheme of FIG. 1, it is considered that sampling of the current and transmission of sampled current data occur at the same moment, that is, there is no transmission processing delay in the circuit data. Communication delay can be determined by an average value of communication time. For example, in FIG. 1, the differential protector A transmits message 1 to the differential protector B at time node tA1, and the message 1 includes the current data sampled at time point tA1. The differential protector B transmits message 2 to the differential protector A at time node tB3, and the message 2 includes the current data sampled at time point tB3. tp1 is a transmission delay from the differential protector A to the differential protector B (which may also be referred to as propagation delay, communication delay, etc.), and tp2 is a transmission delay from the differential protector B to the differential protector A. tc is a duration between a moment tB* at which differential protector B receives the message 1 and the time node tB3, and tA* is a moment at which differential protector A receives the message 2. Message 2 may also include tc.

Therefore, it can be considered that the transmission delay tp1=transmission delay tp2=½(tA*−tA1−tc). Further, a calculated value tB3*=tA*−tp2 for the time node tB3 at which the differential protector B transmits the message 2 can be calculated. The tB3* can be considered as an estimated value of a time point at which the differential protector A collects the current data that needs to be aligned with the current data sampled by the differential protector at time point tB3. Therefore, the current data collected at a time node of the time nodes tAn that is closest to tB3* is the current data aligned with the current data collected at time point tB3.

In the scheme of FIG. 1, since the differential protector A and the differential protector B can directly use the current mutual inductance to sense the current in the power line, the time required to obtain the sampled current using the current mutual inductance sampling is negligible, so the error in data alignment is relatively small.

However, in the differential protection system using the process bus, the differential protector does not obtain current values of the power line directly from the current mutual inductance, instead, a sampling device, such as a merging unit, samples and preliminarily processes current values collected by a current transformer, and then the sampling device transmits processed sampled current data to the differential protector through the process bus. In this process, the presence of the sampling device causes a delay from conducting sampling to receiving the sampled data by the differential protector, which may include a delay from the sampling to obtaining the sampled current data by the sampling device and a network transmission delay for transmitting the sampled current data to the differential protector over the network. The delay may exceed an allowable error range and may be time varying. Therefore, the asynchronous alignment method in FIG. 1 is not applicable to scenarios where the process bus is used.

In this case, a differential protection scheme for synchronous alignment can be used. In the differential protection scheme for synchronous alignment, differential protectors A and B and their sampling devices are time-synchronized by the same satellite positioning system, so that current data sampled at the same time node in different differential protectors can be determined based on the same time stamp. However, the differential protection scheme for synchronous alignment must ensure that time synchronization is not lost, and data alignment cannot be realized once time synchronization is lost. In the case where the time synchronization is lost, only asynchronous alignment can be used, and the asynchronous alignment scheme in FIG. 1 does not realize good data alignment for situations where there are delays in obtaining of current data and/or in transmission processing (e.g., scenarios using the process bus).

Figure 2:
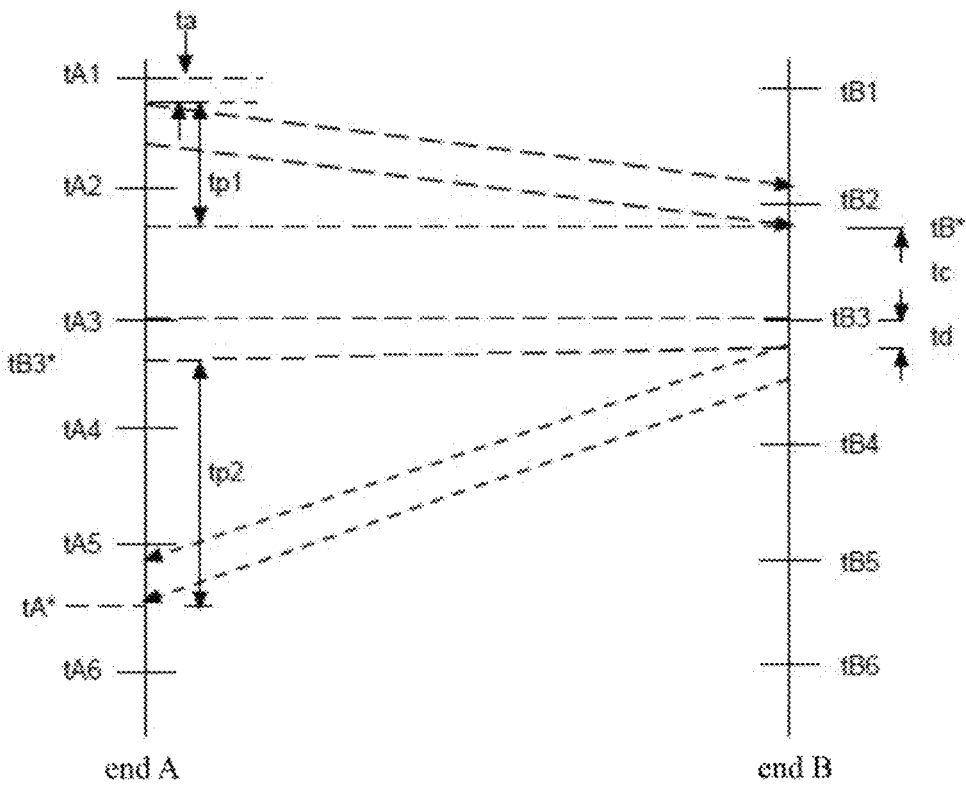
FIG. 2 illustrates a timing schematic diagram of a data alignment scheme in a case of obtaining current data with delay.

FIG. 2 illustrates a timing schematic diagram of a data alignment scheme with transmission processing delay of current data.

When the ends A and B are synchronized, the differential protectors and sampling devices at the ends A and B can be physically synchronized by, for example, a GPS satellite positioning system, a satellite positioning module for example can generate a Pulse Per Second (PPS) signal at regular intervals for time alignment. Therefore, current sampling moments at both end A and end B can be based on the PPS signal. For example, both end A and end B can sequentially label the current data sampled between the two PPS signals. The same labeled current data indicates the current data collected at the same time. In the case of time synchronization, alignment can be performed according to the label of the current data.

However, when the two ends lose time synchronization, for example, when the satellite signal is lost at either end, the data with the same label does not represent the data collected at the same time, thus requiring an asynchronous alignment method for alignment. For example, differential protector A and differential protector B can use the scheme of FIG. 1 to realize data alignment, but there are errors in the alignment due to delays in the transmission processing of the data.

For example, in FIG. 2, differential protector A receives the current data at time node tA1 and transmits message 1 to the differential protector B after a delay ta. The differential protector B receives the message 1 at moment tB*. After receiving the message 1, the differential protector B needs to wait for the time node tB3 for the next obtaining of the sampled data, and there is a time duration tc between them. Similar to the differential protector A, the differential protector B has a transmission processing delay td from obtaining the sampled data to actually transmitting the message. The differential protector B actually transmits the message 2 at moment tB3*, and the differential protector A receives the message 2 at moment tA*. If the estimated value of tB3* and its corresponding current data at end A are still calculated according to the asynchronous alignment method of FIG. 1, there will be deviations.

However, in the scenarios corresponding to FIG. 1 or FIG. 2 above, the use of a merging unit for current sampling is not involved. After the use of the merging unit, once there is no time synchronization, it is impossible to determine and eliminate the delay caused by the merging unit and to correctly perform differential protection.

The embodiments of the present disclosure provide a data alignment method, a differential protector, and a differential protection system which can correctly perform differential protection when the differential protectors lose time synchronization.

Figure 3:
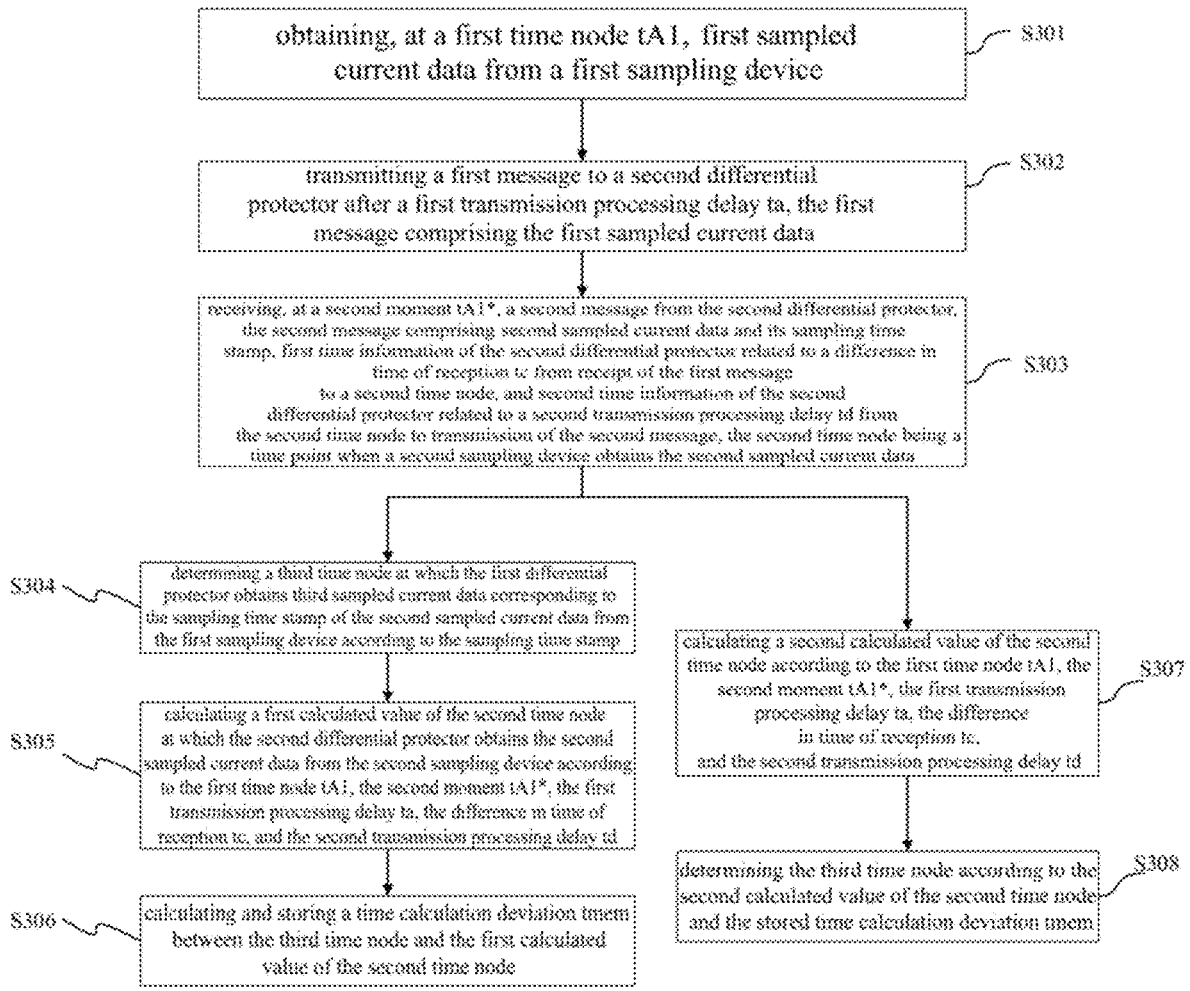
FIG. 3 illustrates a flowchart of a data alignment method provided by embodiments of the present disclosure.

FIG. 3 illustrates a flowchart of a data alignment method for a first differential protector provided in accordance with at least one embodiment of the present disclosure.

The data alignment method includes the following steps:

Step S301, obtaining, at a first time node tA1, first sampled current data from a first sampling device.

Step S302, transmitting a first message to a second differential protector after a first transmission processing delay ta, the first message comprising the first sampled current data.

Step S303, receiving, at a first moment tA1*, a second message from the second differential protector, the second message comprising second sampled current data and its sampling time stamp, first time information of the second differential protector related to a difference in time of reception tc from receipt of the first message to a second time node, and second time information of the second differential protector related to a second transmission processing delay td from the second time node to transmission of the second message, the second time node being a time point when a second sampling device obtains the second sampled current data.

Step S304, determining a third time node at which the first differential protector obtains third sampled current data corresponding to the sampling time stamp of the second sampled current data from the first sampling device according to the sampling time stamp.

Step S305, calculating a first calculated value of the second time node at which the second differential protector obtains the second sampled current data from the second sampling device according to the first time node tA1, the first moment tA1*, the first transmission processing delay ta, the difference in time of reception tc, and the second transmission processing delay td.

Step S306, calculating and storing a time calculation deviation tmem between the third time node and the first calculated value of the second time node.

Step S307, calculating a second calculated value of the second time node according to the first time node tA1, the first moment tA1*, the first transmission processing delay ta, the difference in time of reception tc, and the second transmission processing delay td.

Step S308, determining the third time node according to the second calculated value of the second time node and the stored time calculation deviation tmem.

Figure 4:
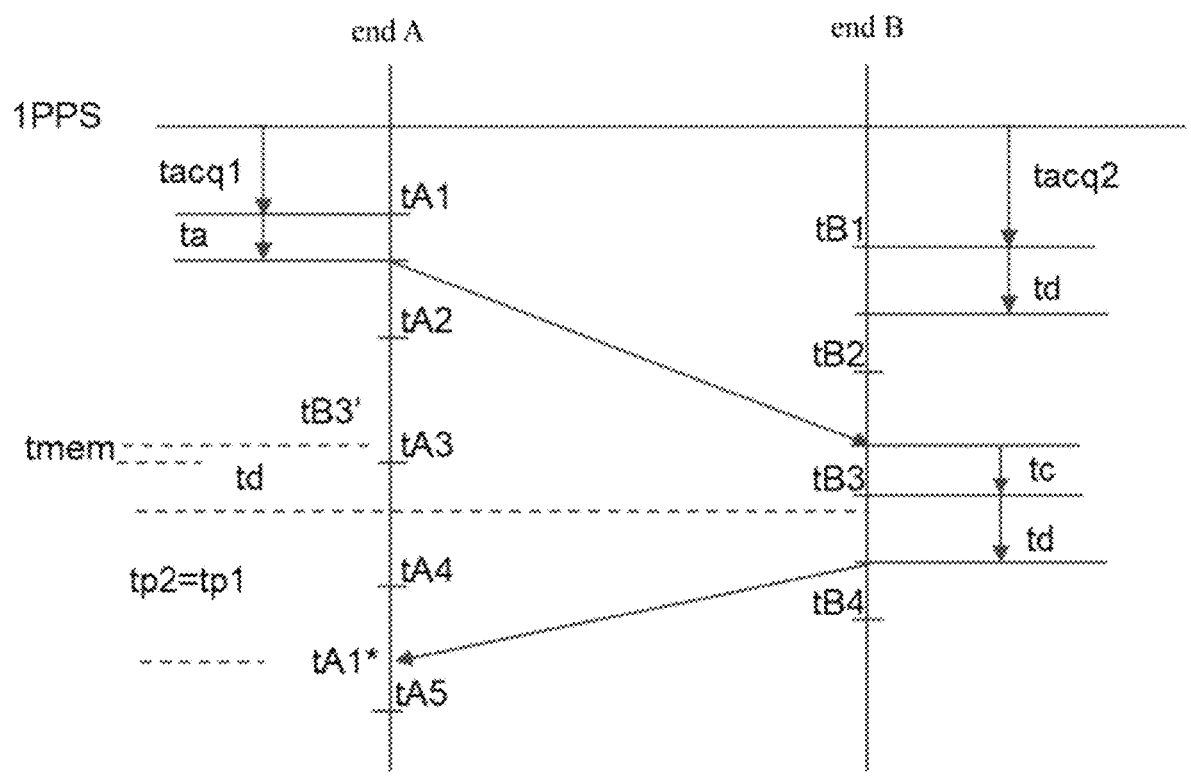
FIG. 4 illustrates a timing schematic diagram of a data alignment method provided by embodiments of the present disclosure.

FIG. 4 illustrates a timing schematic diagram of a data alignment method provided in at least one embodiment of the present disclosure.

To better understand the performing of the data alignment method in FIG. 3, the method in FIG. 3 will be described below with reference to the timing schematic diagram of the data alignment method in FIG. 4. In this embodiment, the first message is noted as message 1, the second message is noted as message 2, the first differential protector is noted as differential protector A, and the second differential protector is noted as differential protector B. The differential protector involved in the present disclosure may be, for example, a relay. It is understood that although only two differential protectors are shown in FIG. 4, there may be cases where more than or equal to three differential protectors communicate with each other and perform the data alignment method as in FIG. 3. However, in the case where more than three differential protectors communicate with each other, any two differential protectors perform the data alignment method with each other in the same manner as described in connection with FIG. 4 and will not be described herein.

The differential protector A and the differential protector B and their first and second sampling devices may use satellite timing to maintain time synchronization, such as GPS, BeiDou, Galileo and other satellites. Satellites can transmit PPS signals to the differential protector A and the differential protector B to realize time synchronization. Time synchronization can also be realized by any other periodic time synchronization signal with fixed duration. In the present disclosure, maintaining time synchronization between the differential protector A and the differential protector B includes maintaining time synchronization between the first sampling device and the second sampling device. However, after the differential protector A and the differential protector B lose time synchronization, the first sampling device and the second sampling device also lose time synchronization, thus it is impossible to ensure that the first sampling device and the second sampling device sample the current at the same moment, and it is impossible to know the time corresponding to the current actually sampled by the sampling device.

For example, both the differential protector A and the differential protector B are synchronized using the PPS signal of GPS, tAn is a time node when the differential protector A receives sampled current data transmitted by the first sampling device, tBn is a time node when the differential protector B receives the sampled current data transmitted by the second sampling device, and n is a positive integer.

The first sampling device may be a first merging unit MU1 and the second sampling device may be a second merging unit MU2, or the sampling device may also include a merging unit and a current transformer. The first sampled current data is recorded as sampled current data 1, and the second sampled current data is recorded as sampled current data 2.

The first merging unit and the second merging unit obtain sampled currents from different locations on the same power line, process the sampled currents and transmit them to the differential protector A and the differential protector B, respectively, via the process bus. tacq1 is a delay from the time the first sampling device samples the first sampled current to the time the differential protector A obtains the first sampled current data, and tacq2 is a time delay for the differential protector B to receive another sampled current data sampled at the same moment as the first sampled current data. For example, 1PPS in FIG. 4 occurs at moment T0, where there is a current in the power line at moment T0, and both the first sampling device and the second sampling device sample the current, with the first sampling device sampling the current 1 at the end A and the second sampling device sampling the current 2 at the end B. At the time node tA1 of moment T0 plus the delay tacq1, the differential protector A receives the sampled current data of the current 1, and at the time node tB1 of moment T0 plus the delay tacq2, the differential protector B receives the sampled current data of the current 1. The values of the tacq1 and tacq2 may be equal to 0, i.e., the data alignment method involved in the present disclosure is applicable to situations where sampling devices are all merging units, and situations where sampling devices include a combination of merging units and current transformers.

In FIG. 4, a variety of time-related parameters are involved. For the sake of distinction, the time point when the differential protectors receive the sampled current data is referred to as "time node", while the time point when messages are transmitted and received between the differential protectors is referred to as "moment". Each delay should be understood as a period of time, and the time difference is also referred to as a period of time. It should also be understood that all the time nodes in FIG. 4 and the moments at which messages are received are only schematic, and that the message 1 transmitted at time node tA1 is not necessarily received between tB2 and tB3. The length between time nodes, the moments for transmitting and receiving messages, as well as the transmission processing delay, the reception delay and the transmission delay are all adaptive to the actual application. The specific notations "tB3" and "tA3" used herein are only examples but not limitations.

Performing step S301. The differential protector A obtains, at time node tA1, sampled current data 1 from MU1. The sampled current data 1 may carry a sampling time stamp of MU1 for the sampled current data 1, which reflects a sampling time of the sampled current data 1, for example, indicating the sequence number of the sampled current data 1 among the sampled data since the MU1 generates the PPS signal from its satellite positioning module.

Performing step S302. The differential protector A transmits the message 1 to the differential protector B after the transmission processing delay ta, the message 1 comprises the sampled current data 1. Optionally, the message 1 may also carry the identification of the time node tA1 and the transmission processing delay ta. Correspondingly, the message 2 also carries the identification of the time node tA1, so that the differential protector A, after receiving the message 2, may determine the time node tA1 corresponding to the moment tA1*.

Performing step S303. The differential protector A receives, at the moment tA1*, the message 2 from the differential protector B, the message 2 comprises the sampled current data 2 and its sampling time stamp, the first time information of the differential protector B related to the difference in time of reception tc from receipt of the message 1 to the time node tB3, and the second time information of the differential protector B related to the transmission processing delay td from the time node tB3 to transmission of the message 2, the time node tB3 is the time point when the MU2 obtains the sampled current data 2. The sampling time stamp of the sampled current data 2 reflects the sampling time of the sampled current data 1, for example, indicating the sequence number of the sampled current data 2 among the sampled data since the MU2 generates the PPS signal from its satellite positioning module.

The first time information may include the time node tB3 and the moment when the message 1 is received by the differential protector B, or may include the time difference tc between them. The second time information may include the transmission processing delay td.

It should be noted that steps S301-S303 will be performed regardless of whether the differential protector A and the differential protector B maintain time synchronization or lose time synchronization.

The differential protector A is always aware of its connection status with the GPS, and after receiving the message 2, the differential protector A may know whether the differential protector B is still in time synchronization. Optionally, the message 2 also indicates that the differential protector B loses time synchronization or regains time synchronization. For example, the message 2 carries a flag of whether the differential protector B maintains in time synchronization with the GPS.

When it is determined that the time synchronization is maintained, the differential protector A continues to perform steps S304 to S306.

At step S304, the differential protector A determines a time node at which it obtains sampled current data 3 corresponding to the sampling time stamp of the sampled current data 2 from MU1 according to the sampling time stamp. For example, the sampling time stamp indicates that the sampled current data 2 is the third sampling result from the current PPS signal, and the differential protector A determines that the third sampling result from the current PPS signal is obtained at the time node tA3, then the differential protector A determines that the time node tA3 is the time node corresponding to the time node tB3, and the data obtained at the time node tA3 is aligned with the data obtained at the time node tB3.

At step S305, a first calculated value tB3' of the time node tB3 for the differential protector B to obtain the sampled current data 2 from MU2 is calculated according to the time node tA1, the moment tA1*, the transmission processing delay ta, the difference in time of reception tc, and the transmission processing delay td.

For example, a calculated value tp for transmission delay of data transmission between the differential protector A and the differential protector B is calculated using the time node tA1, the moment tA1*, the transmission processing delay ta, the difference in time of reception tc, and the transmission processing delay td. For example, tp=½(tA1*−tA1−ta−tc−td).

A first calculated value (shown as tB3' in the figure) is then calculated using the moment tA1*, the transmission processing delay td and the transmission delay tp. The transmission delay tp1 from the differential protector A to the differential protector B and the transmission delay tp2 from the differential protector B to the differential protector A can be considered equal in the calculation, i.e., tp=tp1=tp2. The first calculated value tB3'=tA1*−td−tp.

At step S306, a time calculation deviation tmem between the time node tA3 and the first calculated value tB3' is calculated and stored. For example, tmem=tA3−tB3'. The tmem comprehensively considers tacq1, tacq2, tp1 and tp2 so that the data alignment can be accurately realized in case of loss of time synchronization.

Upon determining the loss of time synchronization, the differential protector A proceeds to steps S307 and S308. It is noted that whenever any one of all differential protectors in communication connection loses time synchronization, the rest of the differential protectors will enter the state of loss of time synchronization.

At step S307, the differential protector A calculates a second calculated value tB3" of the time node tB3 according to the time node tA1, the moment tA1*, transmission processing delay ta, the difference in time of reception tc, and transmission processing delay td. For example, tB3"=tA1*−td−tp. The calculated value tp of the transmission delay may be pre-stored or calculated during the performing of step S307 in a manner described in connection with step S305 and will not be repeated herein.

Continuing with step S308, the differential protector A determines the third time node tA3 according to the second calculated value tB3" of the time node tB3 and the stored time calculation deviation tmem.

For example, an estimated value tA3' of the third time node is calculated from the sum of the second calculated value tB3" and the time calculation deviation tmem, e.g., tA3'=tA1*−td−tp+tmem. The third time node is the required alignment of the second time node in the differential protector A The third time node is the time node the second time node needs to be aligned with in the differential protector A. Therefore, the estimated value of the third time node depends on the information related to the second time node.

The time node closest to the estimated value tA3' of the third time node among a plurality of time nodes tAn at which the differential protector A receives the sampled current data from MU1 is then used as the third time node.

In the data alignment method provided by the embodiment, the delay compensation is calculated and recorded in advance when the differential protector maintains time synchronization with the satellite, so that when the synchronization is lost, the delay compensation obtained in advance can be used to maintain the differential protector for normal differential protection.

In some embodiments, the differential protector A calculates and stores the time calculation deviation tmem whenever the time synchronization signal is received. i.e., the differential protector continuously updates the time calculation deviation tmem while maintaining time synchronization so that the stored time calculation deviation tmem is always up-to-date and most consistent with the sampling delay variation of the sampling device when time synchronization is lost, so as to further reduce errors.

Continuing with FIG. 4, it is noted that at each time point tAn in FIG. 4, the differential protector A can perform the data alignment method described above. Similarly, the data alignment method can also be performed by the differential protector B.

Figure 5:
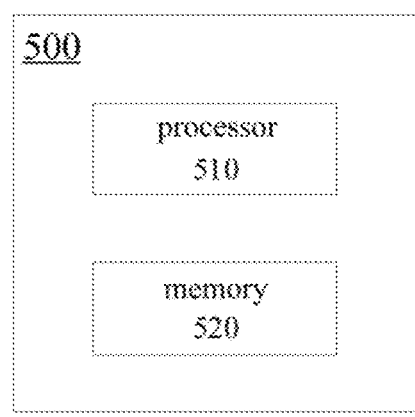
FIG. 5 illustrates a schematic diagram of a differential protector provided by embodiments of the present disclosure.

FIG. 5 illustrates a schematic diagram of a differential protector provided by embodiments of the present disclosure.

In FIG. 5, the differential protector 500 includes a processor 510 and a memory 520 on which program codes are stored, and the program codes, when executed by the processor 510, perform the data alignment method as in the above-described embodiment. The manner in which the processor 510 performs the data alignment method is described in the above embodiment and will not be expanded herein. Through performing the data alignment method, the differential protector 500 can be applied to differential protection where the differential protectors lose time synchronization and there is a large delay or uncertain delay in obtaining current data.

Figure 6:
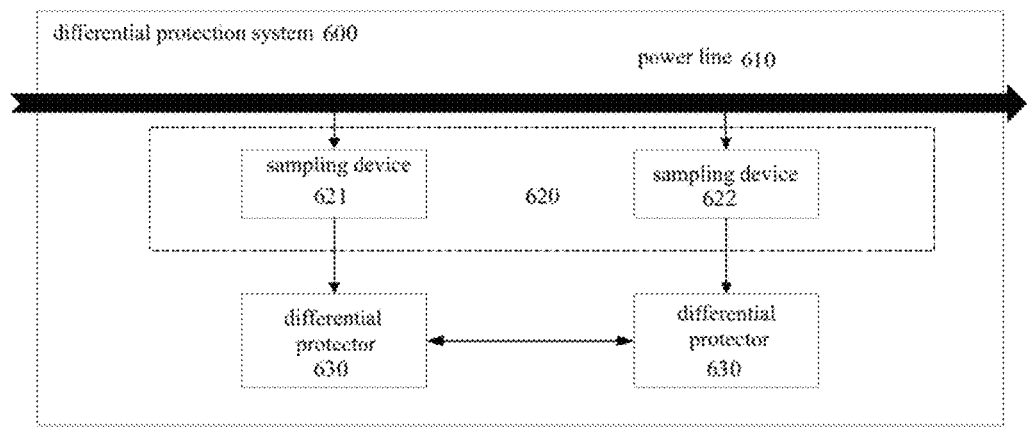
FIG. 6 is a schematic diagram of a differential protection system for power lines provided by embodiments of the present disclosure.

FIG. 6 illustrates a schematic diagram of a differential protection system for power lines provided by embodiments of the present disclosure.

In FIG. 6, a differential protection system 600 is used to protect power line 610. The differential protection system 600 may include sampling devices 621 and 622, a differential protector 631, and a differential protector 632.

The sampling devices 621 and 622 are connected to the power line 610. The sampling devices 621 and 622 are configured to obtain sampled currents from the power line 610 and to process the sampled currents.

The differential protector 630 is connected to the sampling device 621 and is configured to receive first sampled current data transmitted by the sampling device 621. The differential protector 632 is connected to the sampling device 622 and is configured to receive second sampled current data transmitted by the sampling device 622.

The differential protector 631 and the differential protector 632 may both be the differential protectors in the above embodiment. The sampling devices 621 and 622 may be merging units.

Both differential protectors 631 and 632 may perform the data alignment method described in the method embodiment above, thereby enabling compensation of delays caused by the sampling devices and effective alignment of the sampled current data and normal protection of the power line from misoperation when time synchronization is lost.

The above embodiment of the present disclosure illustrates the data alignment method when there is a delay in the obtaining and processing of current data by taking the merging unit and the process bus as examples. Various delay situations in the process bus scenario are further described below.

Figure 7:
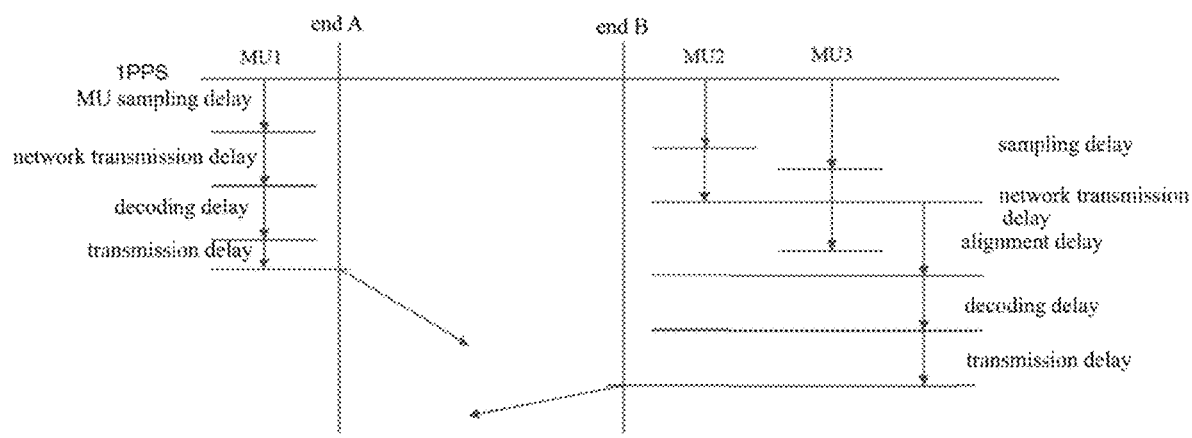
FIG. 7 is a timing schematic diagram of a process bus scenario provided by embodiments of the present disclosure.

FIG. 7 is a timing schematic diagram of a process bus scenario provided in at least one embodiment of the present disclosure.

In FIG. 7, current sampling is performed by merging units MU1, MU2, and MU3. For example, MU1, MU2, and MU3 sample currents from power lines at different locations. Mill, MU2, and MU3 use PPS from GPS to realize synchronized sampling. The power lines at different locations can be different locations of a power line or different power lines. The differential protector A is used at end A and the differential protector B is used at end B. MU1 is connected to the differential protector A through network, and MU2 and MU3 are connected to the differential protector B through network. The differential protector B receives data from MU2 and MU3, and the differential protector B will firstly perform data alignment on the data from MU2 and MU3.

In the scheme of the process bus, the differential protector A and the differential protector B obtain the sampled current data from MU1 and MU2 (represented by MU2 for MU2 and MU3), respectively.

For the differential protector A, there are MU1 sampling delay, network transmission delay, decoding delay for the differential protector A to decode data transmitted from MU1, and transmission delay due to transmission of data by the differential protector A from the time MU1 performs current sampling to the time the differential protector A transmits the sampled current data from that sampling to the differential protector B.

For the differential protector B, there are MU sampling delays for MU2 and MU3, network transmission delay, alignment delay, decoding delay for the differential protector B to decode data transmitted from MU2, and transmission delay due to transmission of data by the differential protector B.

Among them, the sampling delays of MU1, MU2 and MU3 and the network transmission delays are not controllable by the differential protector A and the differential protector B, while the decoding delays and the transmission delays are relatively stable and can be regarded as fixed values for the differential protector A and the differential protector B. The alignment delay is due to the presence of more than one MU at end B. Multiple MUs need to firstly combine multiple sampled currents into one sampled current, e.g., by vector summation.

For the scenario of the process bus in FIG. 7, the data alignment method, differential protector, and differential protection system in the above embodiments can be adopted, as described above, and will not be repeated here.

It should be noted that the above embodiments of the present disclosure are illustrated by taking the merging unit and the process bus as examples, but the present disclosure is equally applicable to other application scenarios with corresponding delays.

According to embodiments of the present disclosure, the processes described above may also be implemented as computer software programs. For example, embodiments of the present disclosure include a computer program product comprising a computer program, the computer program comprises program codes for performing the method of the above-described process.

The flowchart of the method and block diagrams of the devices involved in the present disclosure are intended as exemplary examples only and are not intended to require or imply that they must be connected or arranged in the manner illustrated in the flowchart and block diagram. As will be recognized by those skilled in the art, the apparatus, devices may be connected and arranged in any manner, as long as the desired purpose is realized.

The scope of protection of the present disclosure is not limited to the specific embodiments of the present disclosure, and the scope of protection of the present disclosure shall be subject to the scope of protection of the stated claims. The drawings accompanying the embodiments of the present disclosure relate only to the structures involved in the embodiments of the present disclosure, and other structures may refer to the usual design. In the case of no conflict, the embodiments of the present disclosure and the features in the embodiments may be combined with each other for new embodiments.

What is claimed is:

1. A data alignment method for a first differential protector, comprising:
  obtaining, at a first time node tA, first sampled current data from a first sampling device;
  transmitting a first message to a second differential protector after a first transmission processing delay ta, the first message comprising the first sampled current data;
  receiving, at a first moment tA*, a second message from the second differential protector, the second message comprising second sampled current data and its sampling time stamp, first time information of the second differential protector related to a difference in time of reception tc from receipt of the first message to a second time node, and second time information of the second differential protector related to a second transmission processing delay td from the second time node to transmission of the second message, the second time node being a time point when a second sampling device obtains the second sampled current data;
  when the first differential protector is in time synchronization with the second differential protector,
    determining a third time node at which the first differential protector obtains third sampled current data corresponding to the sampling time stamp of the second sampled current data from the first sampling device according to the sampling time stamp, and calculating a first calculated value of the second time node at which the second differential protector obtains the second sampled current data from the second sampling device according to the first time node tA, the first moment tA*, the first transmission processing delay ta, the difference in time of reception tc, and the second transmission processing delay td, and calculating and storing a time calculation deviation tmem between the third time node and the first calculated value of the second time node;
  when the first differential protector loses time synchronization with the second differential protector,
    calculating a second calculated value of the second time node according to the first time node tA, the first moment tA*, the first transmission processing delay ta, the difference in time of reception tc, and the second transmission processing delay td, and
    determining the third time node according to the second calculated value of the second time node and the stored time calculation deviation tmem.

2. The data alignment method of claim 1, wherein the calculating the first calculated value of the second time node at which the second differential protector obtains the second sampled current data from the second sampling device comprises:
  calculating a calculated value tp of a transmission delay of data transmission between the first differential protector and the second differential protector using the first time node tA, the first moment tA*, the first transmission processing delay ta, the difference in time of reception tc, and the second transmission processing delay td; and
  calculating the first calculated value using the first moment tA*, the second transmission processing delay td and the calculated value tp of the transmission delay; wherein,
  the calculated value tp of the transmission delay is calculated using the following formula:

$$tp=\tfrac{1}{2}(tA^{*}-tA-ta-tc-td);$$

the first calculated value tB' of the second time node is calculated using the following formula:

$$tB'=tA^{*}-td-tp.$$

3. The data alignment method of claim 1, wherein calculating the second calculated value of the second time node according to the first time node tA, the first moment tA*, the first transmission processing delay ta, the difference in time of reception tc, and the second transmission processing delay td comprises:
  calculating a calculated value tp of a transmission delay of data transmission between the first differential protector and the second differential protector using the following formula:

$$tp=\tfrac{1}{2}(tA^{*}-tA-ta-tc-td);$$

calculating the second calculated value tB" using the following formula:

$$tB''=tA^{*}-td-tp.$$

4. The data alignment method of claim 1, wherein determining the third time node according to the second calculated value of the second time node and the stored time calculation deviation tmem comprises:
  calculating an estimated value of the third time node from the sum of the second calculated value and the time calculation deviation tmem and taking as the third time node a time node closest to the estimated value of the third time node among a plurality of time nodes at which the first differential protector obtains sampled current data from the first sampling device;
  wherein the estimated value tA' of the third time node is calculated using the following formula:

$$tA'=tA^{*}-td-tp+tmem.$$

5. The data alignment method of claim 1, wherein when the first differential protector is in time synchronization with the second differential protector, the method further comprises:
  calculating and storing the time calculation deviation tmem whenever a time synchronization signal is received, or calculating and storing the time calculation deviation tmem whenever the sampled current data from the first sampling device is received.

6. The data alignment method of claim 1, wherein the second message further indicates that the second differential protector loses time synchronization or regains time synchronization.

7. The data alignment method of claim 1, wherein the first sampling device is a first merging unit, and the second sampling device is a second merging unit, the first merging unit and the second merging unit obtain sampled current values from different locations of the same power line respectively.

8. The data alignment method of claim 1, wherein the first differential protector and the second differential protector use satellite timing to maintain time synchronization.

9. A differential protector comprising a processor and a memory having program codes stored thereon, the program codes, when executed by the processor, perform the data alignment method of claim 1.

10. A differential protection system for a power line, comprising:

a first sampling device and a second sampling device configured to obtain sampled current values from different locations at the power line, respectively;
a first differential protector, connected to the first sampling device and configured to receive first sampled current data transmitted by the first sampling device; and
a second differential protector, connected to the second sampling device and configured to receive second sampled current data transmitted by the second sampling device,
wherein the first differential protector and the second differential protector are each the differential protector of claim 9.

* * * * *